July 29, 1958   A. C. SAMPIETRO   2,845,588
MOTOR ASSEMBLY HAVING FREQUENCY MULTIPLYING MEANS
Filed Feb. 1, 1956
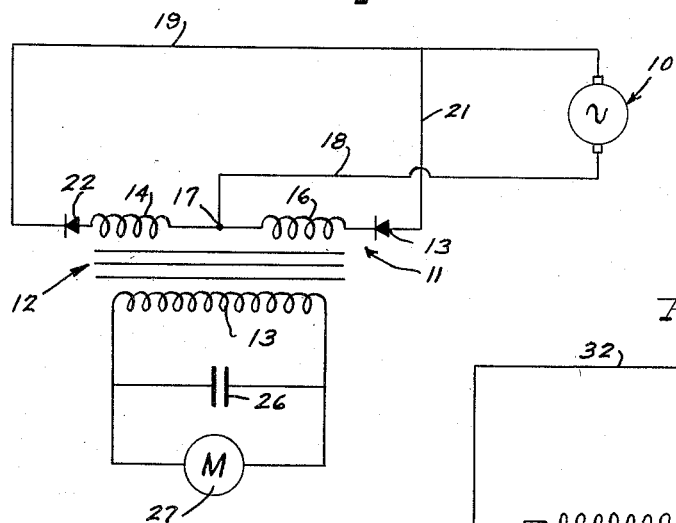
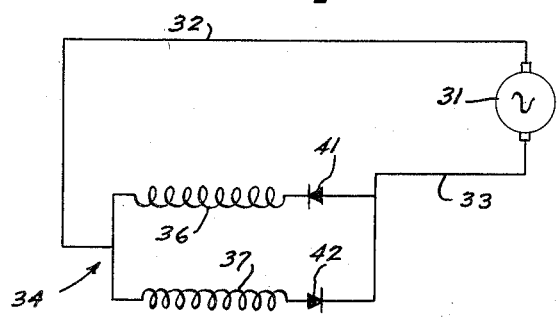
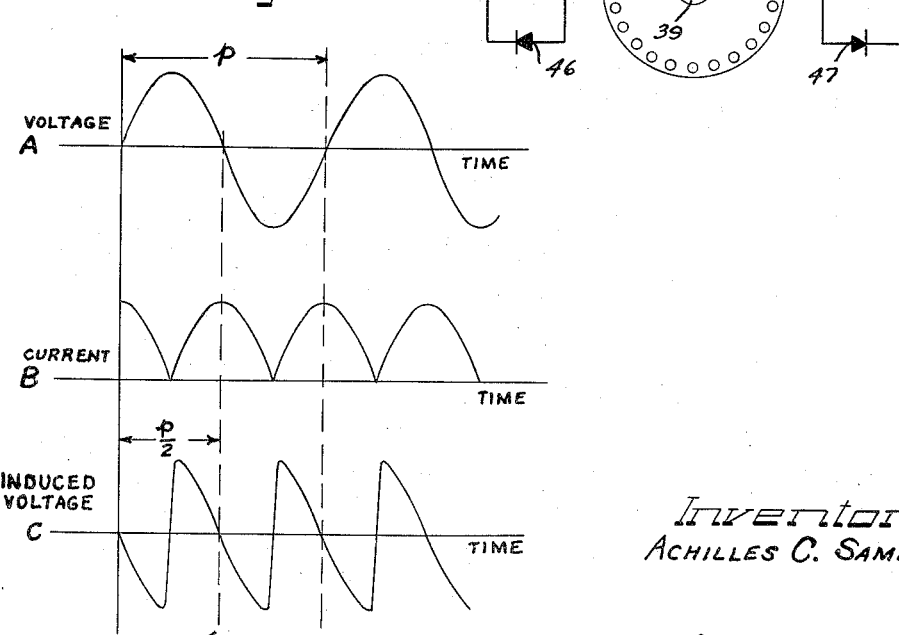
Inventor
ACHILLES C. SAMPIETRO
Attys.

United States Patent Office 2,845,588
Patented July 29, 1958

2,845,588

MOTOR ASSEMBLY HAVING FREQUENCY MULTIPLYING MEANS

Achilles C. Sampietro, Detroit, Mich., assignor to Thompson Products, Inc., Cleveland, Ohio, a corporation of Ohio Application February 1, 1956, Serial No. 562,788

4 Claims. (Cl. 318—231)

The present invention relates to improvements in the field of alternating current motors and, more specifically, to means for increasing the maximum speed attainable by the motor without resorting to complex mechanical devices.

It is known that the maximum speed which can be attained in an alternating current motor is governed by the equation:

$$R.P.M. = \frac{120 f}{P}$$

where $f$ is the frequency of the energizing source, and P is the number of poles. Thus, the maximum speed obtainable in a two pole motor operating at a frequency of 60 cycles would be 3600 R. P. M.

It is known that the speed of a given alternating current motor assembly operating with a minimum of two poles and a fixed energizing frequency can be increased by a frequency converter which is mechanically coupled to the shaft of the alternating current motor such as an induction motor. However, the size, weight, and cost of such mechanical converter systems are frequently excessive and for that reason they are not commonly employed.

An object of the present invention is to provide an improved frequency control unit for use with alternating current motors.

Another object of the invention is to provide a purely electrical frequency multiplying system for increasing the speed obtainable in existing alternating current motors without modifying the motor structure itself.

Still another object of the invention is to provide an improved motor assembly with a built-in frequency responsive means which operates to increase the maximum attainable speed of the motor.

Basically, the motor assembly of the present invention provides an alternating current motor with an energizing circuit including a rectifier means in the circuit arranged to convert an alternating current source into an induced voltage having twice the frequency of the source. This rectified and induced voltage is then used to energize the motor, or the process may be repeated any number of times to get higher multiples of the original frequency.

The attached sheet of drawings illustrates the principles of the present invention as applied to two specific embodiments thereof.

In the drawings:

Figure 1 is a schematic diagram of a motor assembly unit embodying the principles of the invention;

Figure 2 is a schematic view of a modified form of motor assembly employing the principles of the invention; and Figure 3 is a series of graphs illustrating various voltage and current waveforms occurring during operation of the system illustrated in Figure 1.

As shown in the drawings:

In Figure 1, reference numeral 10 indicates generally an alternating current generator or other suitable source of alternating current which energizes a center tapped primary 11 of a transformer circuit including a core 12 and a secondary winding 13. The two halves of the center tapped primary 11 are designated at numerals 14 and 16, respectively. The center tapped portion 17 between the windings 14 and 16 is connected to one side of the generator 10 by means of a conductor 18, and the opposite end of the winding 14 is energized by connection through a conductor 19 to the opposite side of the generator 10. A conductor 21 connects the opposite side of the winding 16 to the generator 10.

Each of the windings 14 and 16 have associated with it a rectifier, permitting flow of current substantially only in one direction. A rectifier 22 is associated with the winding 14 and a rectifier 23 is associated with the winding 16.

In Figure 3, there is illustrated a series of graphs indicating the relationships between the voltages and the currents in the circuit. The voltage from the generator 10 has been indicated in graph "A" and as evident in that view, it follows a normal sinusoidal curve having a frequency, $f$, which is the reciprocal of the period, $p$, indicated in graph "A."

Assuming a no-load condition, the current flowing through the windings 14 and 16 will be of the waveform illustrated in graph "B." As seen in that view, the rectifiers 22 and 23 convert the sinusoidal variations into a series of fully rectified pulses. Assuming a purely inductive circuit, with no load, the current lags the voltage illustrated in graph "A" by a phase angle of 90°.

The current in the primary circuit can be represented by the following eqation:

$$\frac{2E_{max.}}{\pi}\left[1 + \tfrac{2}{3}\cos 2(2\pi ft) - \tfrac{2}{15}\cos 4(2\pi ft) + i = e/R = \frac{\tfrac{2}{35}\cos 6(2\pi ft) + \ldots (-1)^{(n/2)+1}(2/n^2-1)\cos n(2\pi ft)}{R}\right]$$

Where $E_{max.}$ is the maximum voltage of the source, $f$ is the frequency, R is the effective resistance of the primary circuit, and $n$ is an even integer.

The variation in current produces a corresponding change of magnetic flux in the transformer circuit, and this flux causes an induced voltage in the secondary winding 13 according to the equation:

$$e = -N\frac{d\Phi}{dt}$$

It will be seen from the above equation that the induced voltage waveform will be substantially the first derivative of the waveform represented in graph "B." This induced voltage waveform has been approximated in graph "C." From the latter, it will be seen that the induced voltage wave is generally non-sinusoidal, but has a fundamental frequency which is twice that of the original waveform represented in graph "A."

Some types of alternating current motors operate more efficiently if the input voltage into the motor is substantially sinusoidal. In order to make the waveform of the induced voltage as represented in graph "C" more clearly sinusoidal, the assembly may include a capacitor 26 across the secondary winding 13. The capacitor 26, in combination with the normal inductive load of the motor 27 which is energized from the secondary winding 13, tends to smooth out the irregularities in the waveform and to render the same more nearly sinusoidal. The frequency, however, is not changed by this modification of the waveform and the fundamental frequency of the induced voltages is still a multiple of the frequency of the original energizing voltage from the generator 10.

The assembly shown schematically in Figure 1 represents an assembly which has generally utility for energizing motors to double the input frequency. However, for certain types of installations, particularly where the power to be handled is small, the transformer shown in Figure 1 may be directly incorporated into the motor unit as illustrated in the showing of Figure 2. In this form of the invention, there is provided an alternating current generator 31 or other source of alternating current, the generator 31 being provided with a pair of conductors 32 and 33 which feed a center tapped stator winding 34 of an induction motor. The stator winding 34 consists of a pair of windings 36 and 37, as shown, which are arranged to provide a rotating magnetic field which drives a squirrel cage rotor 38 mounted on a shaft 39.

A rectifier 41 is associated with the winding 36, and a second rectifier 42 is associated with the winding 37. With the rectifiers in the circuit, the stator winding generates a magnetic field fixed in space and varying between a maximum and zero at twice the frequency of the input voltage received from the generator 31.

The motor assembly of Figure 2 is provided with a plurality of shading windings, one of such winding being associated with each pole of the motor. One of such windings has been illustrated at 43 and the other at 44. These windings are located in close proximity of their associated pole in the manner, for example, of a shading pole in a shaded pole induction motor.

The winding 43 is in a circuit with a rectifier 46 and a second rectifier 47 is included in circuit with the winding 44.

In operation, as the main flux appearing between the stator winding 34 and the rotor 38 increases, it causes a current to circulate in one of the windings 43 or 44, and in the other winding when the main flux decreases. These two fluxes produced at the windings 43 and 44 by the circulating current operate at different times in the cycle, and combine with the main flux in forming a variable field rotating at twice the frequency of the energizing current received from the generator 31.

While the foregoing examples are directed essentially to single phase systems, it will be evident to those skilled in the art that the principles involved in this invention are equally applicable to polyphase systems for providing an induced voltage which is a multiple of the original energizing voltage and thereby increasing the maximum obtainable speed of the motor assembly.

It will also be evident that various modifications can be made to the described embodiments without departing from the scope of the present invention.

I claim as my invention:

1. A motor assembly comprising an alternating current motor having a plurality of poles, a plurality of stator windings in said motor arranged to be energized by an alternating current source, a rotor inductively coupled to said stator windings rectifier means connected to each of said stator windings to provide a fully rectified alternating current voltage across said windings, a plurality of shading windings associated with said poles, and a rectifier connected to each of said shading windings, said shading windings supplementing the main flux induced between said rotor and stator windings to provide a rotating magnetic field at a fundamental frequency which is a multiple of the frequency of the voltage energizing said stator windings.

2. A motor assembly comprising an alternating current motor having a plurality of poles, a center tapped stator winding in said motor arranged to be energized by an alternating current source, a rotor inductively coupled to said stator windings rectifier means connected to each leg of said stator winding providing a fully rectified alternating current voltage across said stator winding, a plurality of shading windings associated with said poles, and a rectifier connected to each of said shading windings, said shading windings supplementing the main flux induced between said rotor and stator windings to provide a rotating magnetic field at a fundamental frequency which is a multiple of the frequency of the voltage energizing said stator windings.

3. A motor assembly comprising a pair of coils in parallel circuit relationship arranged to be connected to an alternating current source, a rectifier connected in series with each of said pair of coils permitting flow of current through its associated coil during one-half of the cycle of the energizing voltage from said alternating current source, a motor energizing winding, means inductively coupling said motor energizing winding to both of said pair of coils, and an alternating current motor connected across said motor energizing winding.

4. A motor assembly comprising a pair of coils in parallel circuit relationship arranged to be connected to an alternating current source, a rectifier connected in series with each of said pair of coils permitting flow of current through its associated coil during one-half of the cycle of the energizing voltage from said alternating current source, a motor energizing winding, means inductively coupling said motor energizing winding to both of said pair of coils, a capacitance connected across said motor energizing winding, and an alternating current motor connected across said motor energizing winding.

References Cited in the file of this patent

UNITED STATES PATENTS 736,884     Shoemaker et al. _____ Aug. 18, 1903